United States Patent [19]
Calmettes et al.

[11] Patent Number: 5,431,454
[45] Date of Patent: Jul. 11, 1995

[54] QUICK CONNECTION

[75] Inventors: Lionel Calmettes, Romorantin Lanthenay; Pascal Detable, Gievres, both of France

[73] Assignee: Etablissements Caillau, Issy Les Moulineaux, France

[21] Appl. No.: 237,620

[22] Filed: May 3, 1994

[30] Foreign Application Priority Data

May 10, 1993 [FR] France ................. 93 05558

[51] Int. Cl.6 ............................................. F16L 35/00
[52] U.S. Cl. .......................................... 285/3; 285/23; 285/93; 285/321
[58] Field of Search ............... 285/93, 23, 321, 319, 285/3, 4

[56] References Cited

U.S. PATENT DOCUMENTS

| | | | |
|---|---|---|---|
| 4,362,323 | 12/1982 | Lodder et al. | 285/23 X |
| 4,846,506 | 4/1989 | Bocson et al. | 285/4 |
| 4,915,420 | 4/1990 | Washizu | |
| 4,925,217 | 5/1990 | Ketcham | 285/93 |
| 4,946,205 | 8/1990 | Washizu | 285/93 X |
| 4,948,176 | 8/1990 | Bartholomew | 285/93 |
| 5,152,555 | 10/1992 | Szebo | 285/93 |
| 5,211,427 | 5/1993 | Washizu | 285/23 |
| 5,228,724 | 7/1993 | Godeau | 285/93 |
| 5,273,323 | 12/1993 | Calmettes et al. | 285/321 |
| 5,297,818 | 3/1994 | Klinger | 285/93 |

FOREIGN PATENT DOCUMENTS

| | | |
|---|---|---|
| 448277 | 9/1991 | European Pat. Off. . |
| 484690 | 5/1992 | European Pat. Off. . |
| 511891 | 11/1992 | European Pat. Off. . |
| 7312793 | 7/1978 | Sweden ................. 285/23 |
| 2216213 | 10/1989 | United Kingdom . |

*Primary Examiner*—Eric K. Nicholson
*Assistant Examiner*—Heather Chun Shackelford
*Attorney, Agent, or Firm*—Marshall & Melhorn

[57] ABSTRACT

This invention relates to a quick connection of a tube capable of being fitted in a connector, said tube presenting, at a determined distance from its end, a shoulder, whilst the connector comprises an O-ring intended to come into contact with the tube in the zone located between its end and the shoulder. A member for locking the tube is mounted in the connector, said member being axially immobilized with respect to the connector and elastically deformable in the radial direction between an inactive configuration and an active configuration in which it abuts on the shoulder. A bush is mounted to slide in the connector between a first position and a second position remote from the first towards the inside of the connector, said bush presenting a stop disposed on the path of the shoulder of the tube and ensuring, in its first position, hold of the locking member in its inactive configuration, whilst the locking member is released when the bush is in its second position.

10 Claims, 4 Drawing Sheets

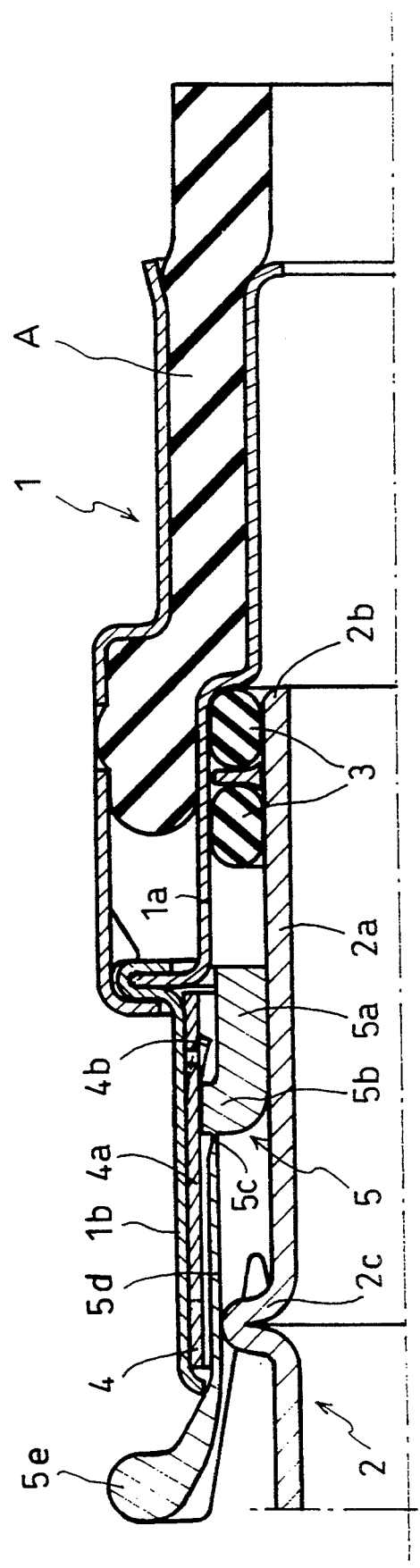
FIG_1

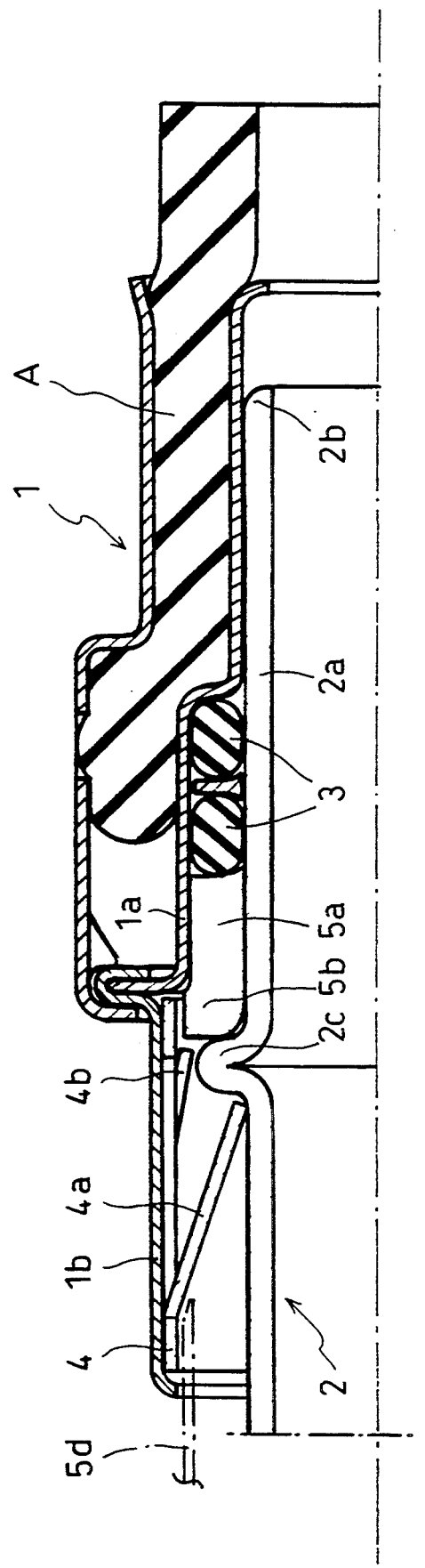
FIG_2

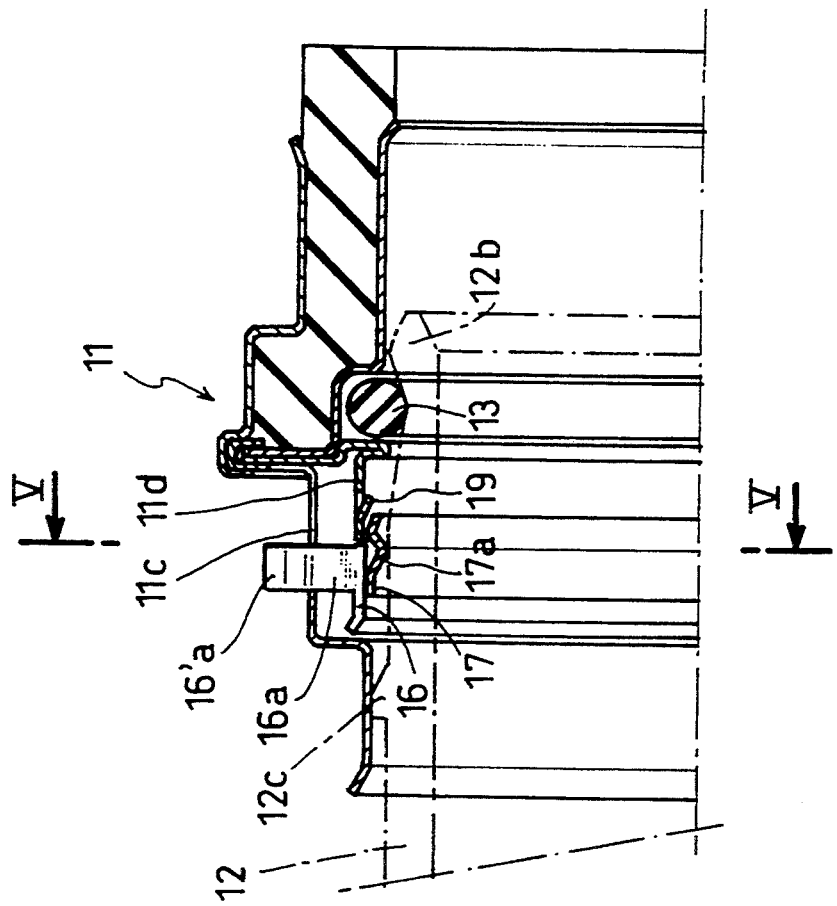
FIG_3
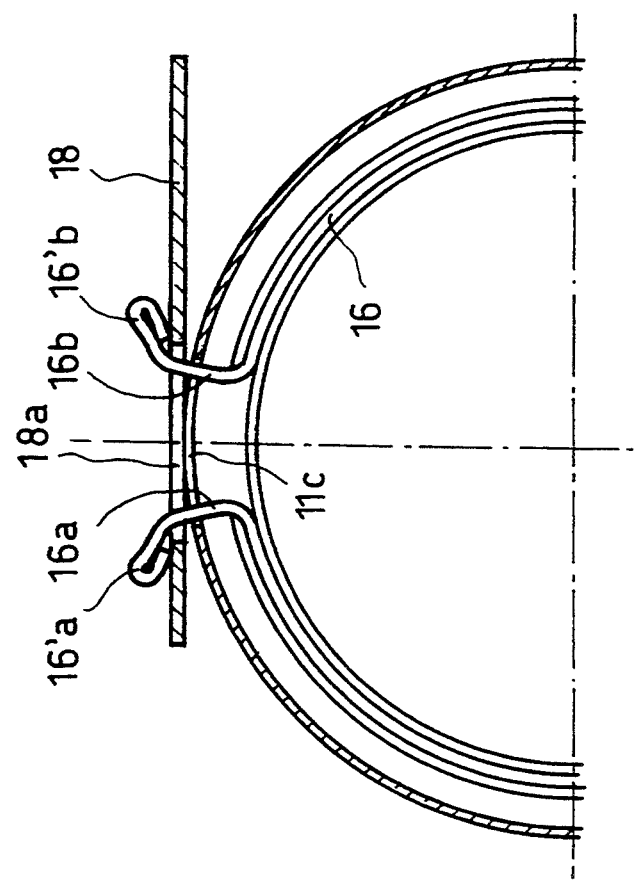
FIG_5

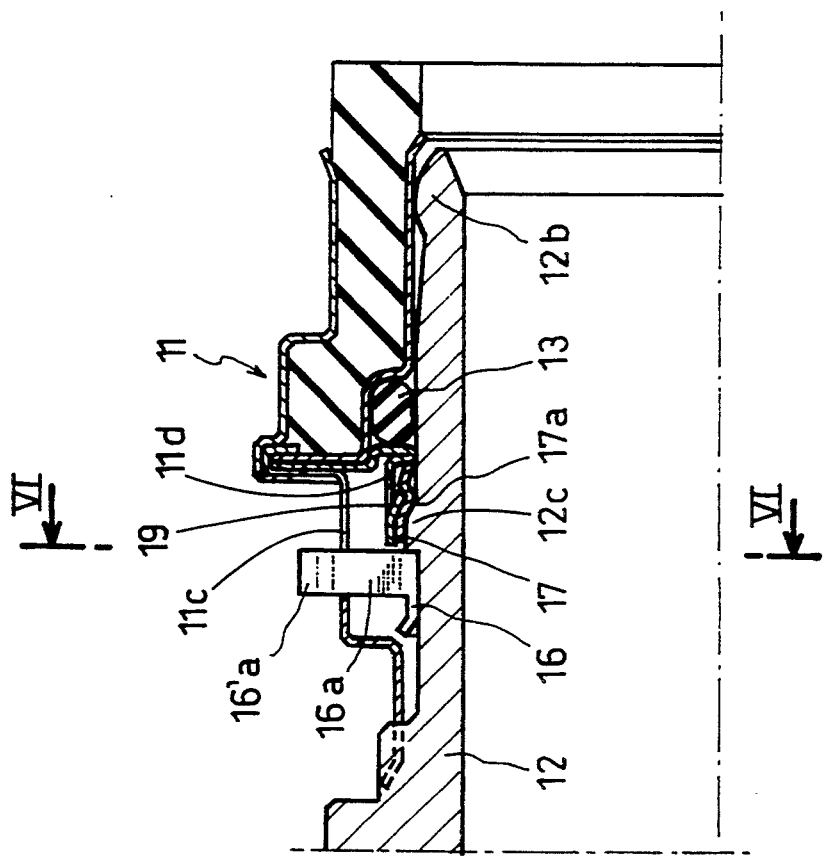
FIG_4
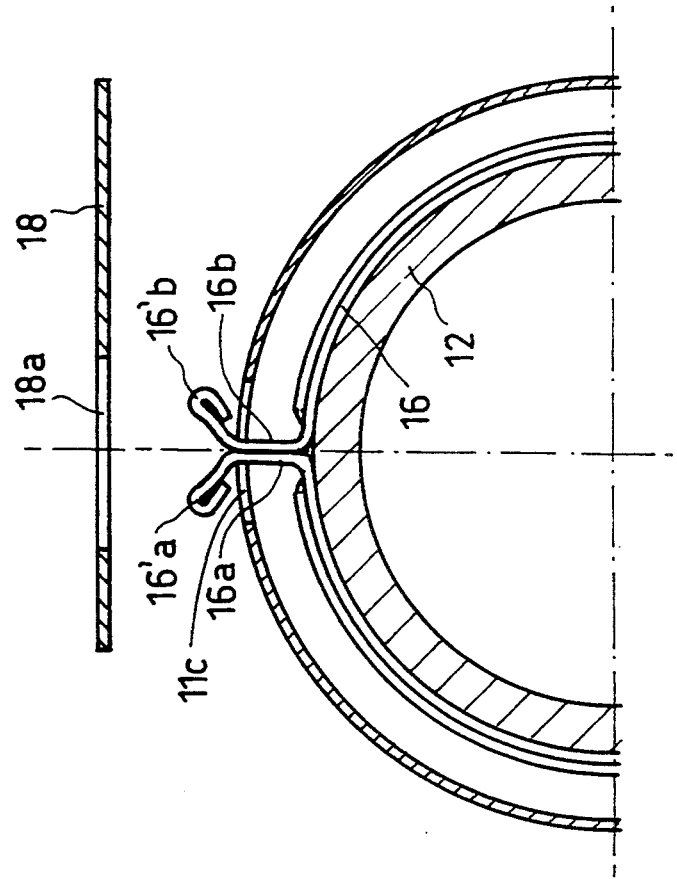
FIG_6

QUICK CONNECTION

FIELD OF THE INVENTION

The present invention relates to a quick connection.

BACKGROUND OF THE INVENTION

Published Patent Applications EP-A-484 690, 491 304 and 511 891 or U.S. Pat. No. 4,875,715, already disclose various types of quick connection of a rigid tube capable of being fitted in a connector and axially locked therein. Such connections are used more and more in mass-production, particularly in automobile construction. They allow easy assembly of the conduits, such as fuel or cooling pipes, conveying fluids, possibly at high temperature.

However, the known connections, whilst being satisfactory from the technical standpoint, generally present a relatively high number of elements whose assembly consequently leads to a sometimes prohibitive cost price. In addition, such connections cannot always be provided with a detachable member when the tube has been locked in the connector, which sometimes renders it difficult to check visually that the tube has been completely locked in its connector.

The present invention therefore has for its object a quick connection of a rigid tube capable of being fitted in a connector, which overcomes the drawbacks which have just been set forth and furthermore presents various advantages.

SUMMARY OF THE INVENTION

The tube to be fitted in the connector generally presents a cylindrical portion at least between its end intended to be fitted and a shoulder or the like, generally annular, projecting on the outer surface of the tube and located at a determined distance from this end. For its part, the connector comprises, in an appropriate inner housing, an O-ring intended to come into contact with the outer surface of the cylindrical portion of the tube located between its end and the shoulder. On the other hand, a member for locking the tube is mounted in the connector. This member is immobilized axially with respect to the connector and is elastically deformable in the radial direction between an inactive configuration and an active configuration, in which it abuts on the shoulder of the tube, on the side opposite its end.

According to the invention, a bush, whose inner diameter is substantially equal to that of the tube, is mounted to slide in the connector between a first position and a second position remote from the first towards the inside of the connector.

This bush presents a stop surface disposed on the path of the shoulder of the tube during fitting thereof in the connector and ensures, in the first position, hold of the locking member in its inactive configuration, whilst said member is released when the bush is in its second position.

Due to its simplicity, the invention may be implemented on various types of connection, particularly on those described in EP-A-511 891 or employing the technique set forth in Patent EP-A-440 564.

BRIEF DESCRIPTION OF THE DRAWINGS

The invention will be more readily understood on reading the following description with reference to the accompanying drawings, in which:

FIGS. 1 and 2 are views in section of a connection according to the invention, in the positions before and after assembly, respectively.

FIGS. 3 and 4 are views in section, similar to FIGS. 1 and 2, of a variant embodiment of the connection.

FIGS. 5 and 6 are sections along V—V and VI-VI, respectively, of FIGS. 3 and 4.

DESCRIPTION OF PREFERRED EMBODIMENTS

Referring now to the drawings, FIGS. 1 and 2 firstly show a connection essentially comprising a connector generally referenced 1, in which a rigid tube 2 is capable of being fitted and locked. Connector 1 is mounted at the end of a flexible pipe A in accordance with a technique similar to that described in Patent EP-A-511 891.

Tube 2 presents a cylindrical portion $2a$ at least between its end $2b$ and a shoulder or bead $2c$ located at a determined distance from this end. Inside the connector 1 is disposed, in an appropriate housing $1a$, at least one O-ring 3 which, as shown in FIG. 1, may come into contact with the outer surface of the cylindrical portion $2a$.

On the other side of shoulder $2c$, tube 2 may be connected, by any appropriate means, to a flexible tube (not shown) or, on the contrary, be intended to be fitted in another connector.

A locking member, generally referenced 4, is immobilized axially in the connector 1, more precisely in the chamber defined by the cylindrical extension $1b$ crimped at the moment of assembly of the various components of the connector. In the example shown, this locking member is constituted by a sleeve presenting appropriate cut-outs over the major part of its length to determine a plurality of blades, such as blade $4a$ visible in FIG. 2.

The material of the sleeve presents a good elasticity and, in their free state, blades $4a$ project inside the sleeve 4 so that their free end is directed towards the inside of the connector, as shown in FIG. 2. As will be understood hereinafter, other blades, such as $4b$, may exist, whose role is accessory with respect to that of blades $4a$.

A bush 5, for example made of plastics material, is disposed in the sleeve 4 where it may slide axially. It presents a cylinder $5a$ and a flange $5b$ located towards the opening of the connector 1 with respect to the cylinder. This latter presents an outer diameter substantially equal to the inner diameter of the housing $1a$ of the O-ring 3 and may consequently penetrate by sliding in this housing.

Before locking tube 2 in connector 1 (FIG. 1), the bush 5 is connected in detachable manner, for example thanks to the presence of a zone of lesser resistance $5c$, to an extension $5d$ which extends outside the connector, more precisely outside its extension $1b$, whilst releasing the end of the connector to allow the tube 2 to be fitted. However, this extension $5d$ presents an appropriate shape such as a bead $5e$, limiting its displacement inside the connector.

In the situation shown in FIG. 1, the bush 5 is in a first position in which its flange $5b$ abuts on the free end of the blades $4a$ of the sleeve 4 which it thus maintains in a so-called inactive configuration. The bead $5e$ is in abutment on the entrance of the connector.

If tube 2 is energetically driven into connector 1, the bead $2c$ firstly abuts on flange $5b$ of the bush which is then pushed towards the right in FIG. 1 until it occupies its second position visible in FIG. 2.

During this movement of slide, the flange 5b releases the free end of the blades 4a of the sleeve 4 which may then take its active configuration. This will take place when the bead 2c will have passed beyond the free end of the blades which will return to the free state, thus forming a stop for the bead and locking the tube 2 in the connector.

Simultaneously, the free end of the cylinder 5a of the bush closes the housing of an O-ring 3 which may, if necessary, be slightly compressed. Tube 2 is then axially immobilized in the connector.

Furthermore, extension 5d of bush 5 has separated from flange 5b by rupture of zone 5c and is ejected towards the outside of the connector by blades 4a, when they take their active configuration.

In this way, the operator can verify complete fit of the tube 2 and axial locking thereof in connector 1, simply by visually examining the position of the extension 5d.

After locking, the tube 2 is extracted from the connector by introducing an appropriate tool for temporarily returning blades 4a into their inactive configuration. During this operation, bush 5 is advantageously maintained in its second position (FIG. 2) by the end of the blades 4b of sleeve 4 which form a stop for flange 5b.

FIGS. 3 to 6 show another embodiment of a connection according to the invention. The elements already described bear the same references, increased by 10, as those of FIGS. 1 and 2. However, it will be noted that O-ring 13 is imprisoned in its housing axially limited, on the connector entrance side, by one of the crimped elements 11d of the connector.

In this second embodiment, the locking member of tube 12 is constituted by an elastic split ring 16, immobilized axially in the connector, whose arms 16a, 16b project outwardly through a longitudinal slot 11c made in one of the crimped elements of the connector. This ring 16 is similar to the one described in Application EP-A-511 891 and may abut behind the bead 12c of the tube, after fitting thereof.

During assembly of the connector 11, a bush 17 is disposed inside the split ring 16 and maintains it in its inactive configuration (FIG. 3). In particular, as may be seen in FIG. 5, the arms 16a, 16b of the ends of the ring 16 are spaced apart from each other. However, prior to positioning the bush 17 in the ring 16, an indicator, or telltale, constituted by a blade 18 pierced with a hole 18a of appropriate shape, has been engaged on the free ends of the arms 16a, 16b. The latter present suitable folds 16'a, 16'b which, after the arms have been spaced apart, prevent the indicator 18 from being removed.

The transverse section of bush 17 presents an undulation 17a directed towards the axis of the connector. This undulation constitutes, on its inner face, an obstacle on the axial path of the bead 12c of the tube during fitting; furthermore, on its outer face, it forms a housing for the free end of at least one embossed portion 19 made on a sleeve adjoining element 112 of the connector, projecting on the inner surface of this sleeve and directed opposite the entrance of the connector.

Positioning of tube 12 in connector 11 is similar to what has been described hereinabove. During the axial movement of the tube, bead 12c abuts on the inner face 17a of bush 17 which is then displaced by sliding from its first position visible in FIG. 3 to its second position shown in FIG. 4. On leaving its first position, the bush releases the split ring 16 which, after passage of bead 12c, will take its active configuration behind the latter, its inner diameter then corresponding to the outer diameter of tube 12.

Arms 16a, 16b of the split ring have moved towards each other, with the result that the indicator 18 leaves them easily, the folds 16'a, 16'b then being able to pass through hole 18a. The operator can thus check locking of tube 12 in connector 11 visually.

Tube 12 is extracted from the connector simply, after having moved arms 16a, 16b apart with an appropriate blade; during extraction of the tube, bush 17 is maintained in the connector thanks to the free end of the embossed portion 19 abutting of the outer face of undulation 17a.

What is claimed is:

1. A quick connection device mounted at the end of a flexible pipe for receiving and locking a rigid tube having a shoulder at a determined distance from the free end of the rigid tube, said quick connection device comprising:
   a) a connector housing having an aperture for receiving the free end of the rigid tube;
   b) an O-ring positioned in said connector housing for contacting the rigid tube between the shoulder and the free end of the rigid tube;
   c) a flexible, shoulder locking member mounted in said connector housing and being axially immobilized with respect to said connector housing and selectively deformable in the radial direction between an inactive configuration and an active configuration in which said shoulder locking member abuts on the shoulder of the rigid tube opposite the free end of the rigid tube;
   d) a bush slidably mounted in said connector housing between a first position and a second position remote from the first position towards the inside of said connector housing, said bush forming a stop disposed on the path of the shoulder of the rigid tube, said bush initially being positioned in the first position to hold said shoulder locking member in the inactive configuration, and being slid to the second position when the rigid tube is received in said connector housing to release said tube locking member to the active configuration;
   e) a rigid bush locking member formed in said connector housing for retaining said bush in the second position when the rigid tube is selectively removed from said connector housing; and
   f) an indicator positioned outside and secured adjacent said connector housing, said indicator being separated from said connector housing when the rigid tube is received in said connector housing to verify locking of said rigid tube in said connector housing.

2. The quick connection device defined in claim 1, wherein said shoulder locking member includes an elastic split ring having a pair of arms extending outwardly through a slot in said connector housing.

3. The quick connection device defined in claim 2 wherein said indicator includes a blade having an aperture for mounting on the arms of said split ring adjacent said connector housing such that the arms are spaced apart in the inactive configuration to retain the blade, and the arms are moved together to release the blade in the active configuration.

4. The quick connection device defined in claim 1 wherein said bush includes an undulation directed towards the axis of the connector, an inner surface of the undulation forming the stop disposed on the path of the shoulder.

5. The quick connection device defined in claim 4 wherein said bush locking member includes an embossed portion formed in and projecting on an inner surface of said connector housing, the embossed portion being directed opposite the aperture in said connector housing.

6. The quick connection device defined in claim 1 said shoulder locking member includes a sleeve having a first plurality longitudinal blades internally formed in said sleeve, said blades having an attached end adjacent the aperture in said connector housing and a free end projecting inside the sleeve in the active configuration such that a free end of the blades is directed opposite the aperture.

7. The quick connection device defined in claim 6 wherein said bush locking member includes a second plurality longitudinal blades internally formed in said sleeve, the blades having an attached end at a midpoint of said sleeve, axially spaced apart from the attached end of the first plurality of blades, and a free end projecting inside the sleeve such that said free end of the second set of blades is directed opposite the aperture.

8. The quick connection device defined in claim 1 wherein said bush and said indicator are integrally formed, said bush including a flanged cylindrical bush having a flange located at the end towards the aperture, and said indicator including a bead in abutment on the aperture of said connector housing, the flanged cylindrical bush and the bead being connected by an extension having a break zone adjacent the flanged cylindrical bush such that the break zone is ruptured to disconnect the extension and bead from said bush when the rigid tube is received in said connector housing.

9. The quick connection device defined in claim 8 wherein said bush and said indicator are made of plastic material.

10. The quick connection device defined in claim 1 wherein said bush includes an inner transverse face which abuts the O-ring and secures said O-ring in said connector housing.

* * * * *